May 31, 1960  R. LE BRUSQUE  2,938,418
MECHANISMS FOR CONTROLLING COPYING DEVICES IN MACHINE-TOOLS
Filed Sept. 13, 1955  6 Sheets-Sheet 1

INVENTOR.
RENE LE BRUSQUE

INVENTOR.
RENE LE BRUSQUE

May 31, 1960        R. LE BRUSQUE        2,938,418
MECHANISMS FOR CONTROLLING COPYING DEVICES IN MACHINE-TOOLS
Filed Sept. 13, 1955        6 Sheets-Sheet 4

INVENTOR.
RENE LE BRUSQUE

May 31, 1960 R. LE BRUSQUE 2,938,418
MECHANISMS FOR CONTROLLING COPYING DEVICES IN MACHINE-TOOLS
Filed Sept. 13, 1955 6 Sheets-Sheet 5

INVENTOR.
RENE LE BRUSQUE

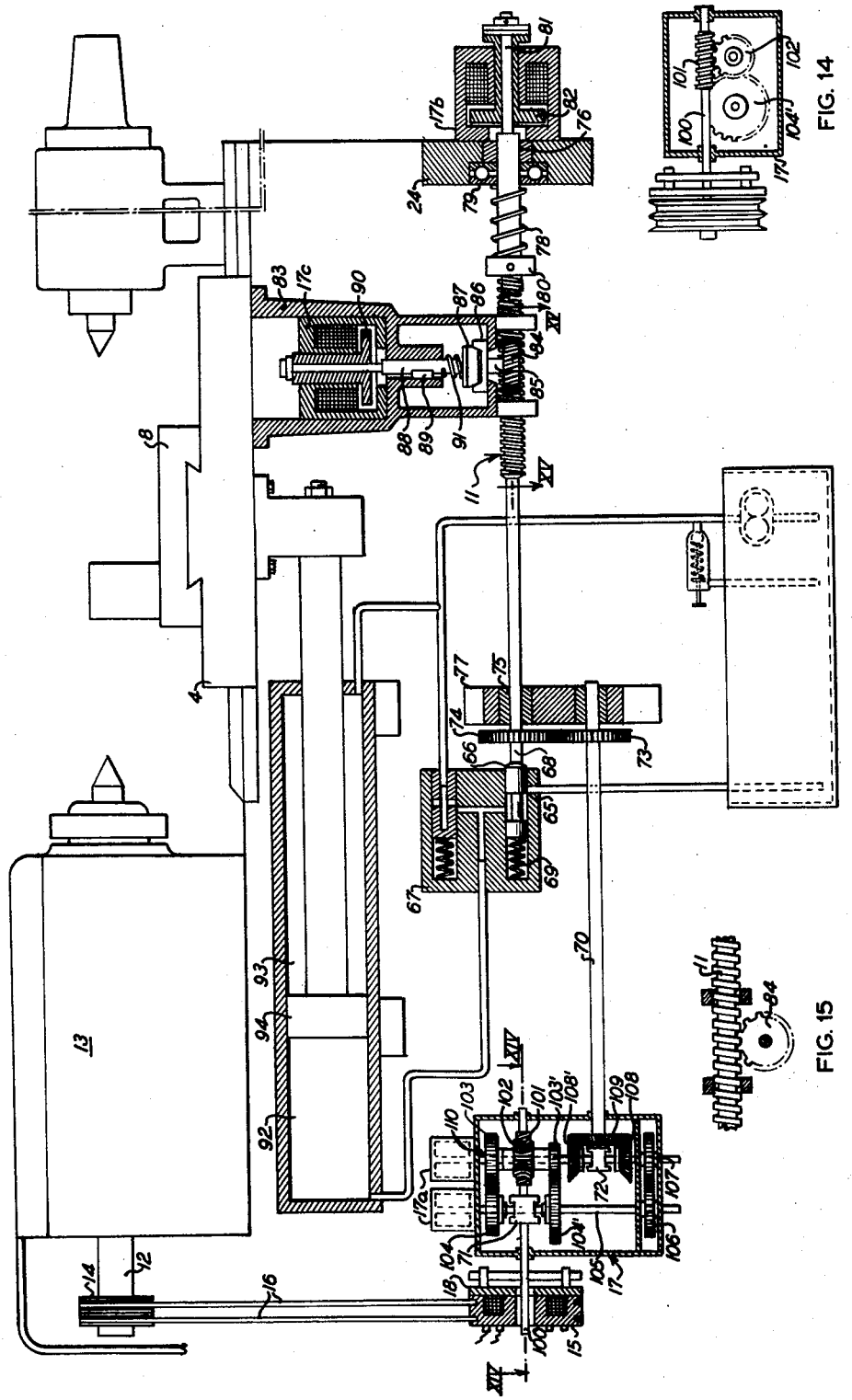

United States Patent Office 2,938,418
Patented May 31, 1960

2,938,418

MECHANISMS FOR CONTROLLING COPYING DEVICES IN MACHINE-TOOLS

René Le Brusque, Malakoff, France, assignor, by mesne assignments, to Société Anonyme H. Ernault-Batignolles, Paris, France, a company of France Filed Sept. 13, 1955, Ser. No. 534,097

Claims priority, application France Sept. 13, 1954

8 Claims. (Cl. 82—14)

The present invention relates to mechanism for controlling the copying tools of machine tools, more particularly in automatic copying lathes.

It is already known in machine-tools to use copying devices comprising essentially a templet (under the form of a steel sheet or preferably a turned piece), a feeler adapted to follow this templet and a servomotor (hydraulic, electric, pneumatic or the like) which transmits impulses from the feeler to a cutting-tool, often with a considerable amplification of force.

Such a device may be applied for example to universal slide lathes, but in such case, the operations other than copying proper, are as a rule effected by hand: starting or engaging, and stopping or disengaging of the motor, withdrawal of the tool at the end of a machining operation to prevent its deterioration during the return travel, return of same to its initial position.

It will be particularly observed that the last two operations are justified by the fact that the work-piece holder and tool-holder of the machine, when freed from the stresses brought about by the cutting effort in the course of the machining operation are subjected to back-lash and naturally tend at the time of their return course, to come nearer each other, thus damaging the cutting edge of the tools and often causing objectionable mars on the machined surface.

Regarding particularly the machine which operate by copying of a templet and use a servomotor for driving the tool-carriage, the backward motion of this carriage is usually obtained without pronounced effort, by manually acting on the feeler in such a manner that by moving the latter away from the templet, the tool clears off the work-piece by the same distance. Numerous mechanisms permit moreover, remote control of said feeler.

In more elaborate lathes, copying devices are also known which use a templet, but this apparatus as a rule is used only for the copying step, the other operations, such as starting or engaging the motor, clearing the tool at the end of a cutting operation, return of the tool back to its initial position, as also accessory operations simultaneously or successively carried out by one or more tool-holders, located either on the transverse slide, or on the upper carriages, etc., all are hydraulically, electrically, pneumatically or otherwise controlled, and carried out either by the operator himself or automatically by members independent from the copying device itself, but often complex and expensive.

Both aforesaid examples were selected in the field of lathes, but it is obvious that similar examples might be cited for any other types of machine-tools; milling, grinding, planing machines, etc.

In view of the interest that lies in using to the maximum the possibilities offered by rotatable copying templets in the field of simple or multiple automatic cycle machines, the present invention has for its objects to substitute for the well-known conventional simple templet, a complex templet adapted to control all or at least a substantial number of displacements of tools even for operations other than copying proper. All these displacements together constitute an automatic cycle.

To this end, such complex templets can be discontinuously rotated on their axis, or even, for certain applications, translated in a direction parallel with said axis or in any other direction.

By causing such a templet to rotate and employing cams of evolution such as those described in the French Patent No. 992,441 of May 20, 1949 and its addition of March 17, 1951 for: "Automatic device for the obtention of continuous manufacturing cycles," filed by the applicant, it is made possible to use the tool-carriage for effecting any machining operation that copying only cannot satisfy (removal of extra-stock, facing, grooving by plunging cuts, etc.).

Such complex templets offer the substantial advantage of simplifying and accelerating the re-setting and adjustment of a machine-tool once one operation is over and another is to be taken up.

It might be said in a certain manner that a complex templet is the materialization, effected once and for all, of a multitude of interdependent adjustments.

Their use makes it possible, by merely inserting a complex templet in the machine, to do away with the long and delicate successive adjustments that an operator has to effect on a multitude of different members in the automatic cycle machine-tools hitherto known.

In other words, the present invention permits the use of automatic cycle machine-tools, either simple or multiple, for machining a series of pieces the number of which is considerably smaller than that presently required for an economical use of the known automatic cycle machine.

The invention will be better understood with reference to the accompanying drawings.

Figs. 7, 7a and 7b to 12, 12a and 12b diagrammatically illustrate the relative positions of the feeler and templet in each step of the simple machining cycle described by way of example.

Fig. 13 is a partially sectional and partially elevational view of the general arrangement of the members taking part in the control of the displacements of the longitudinal carriage.

Figs. 14 and 15 are detail sections taken on lines XIV—XIV and XV—XV, respectively, of Figure 13.

For the sake of simplification, the copying device is diagrammatically shown as a feeler 1 and a tool 2 which are functionally related through mechanical, hydraulic, pneumatic, electric or other means, the latter being of no importance relatively to the operation of the device, it being understood that to every plunging or receding motion of the feeler there corresponds a motion identical and of same direction of the copying tool.

Figure 4:
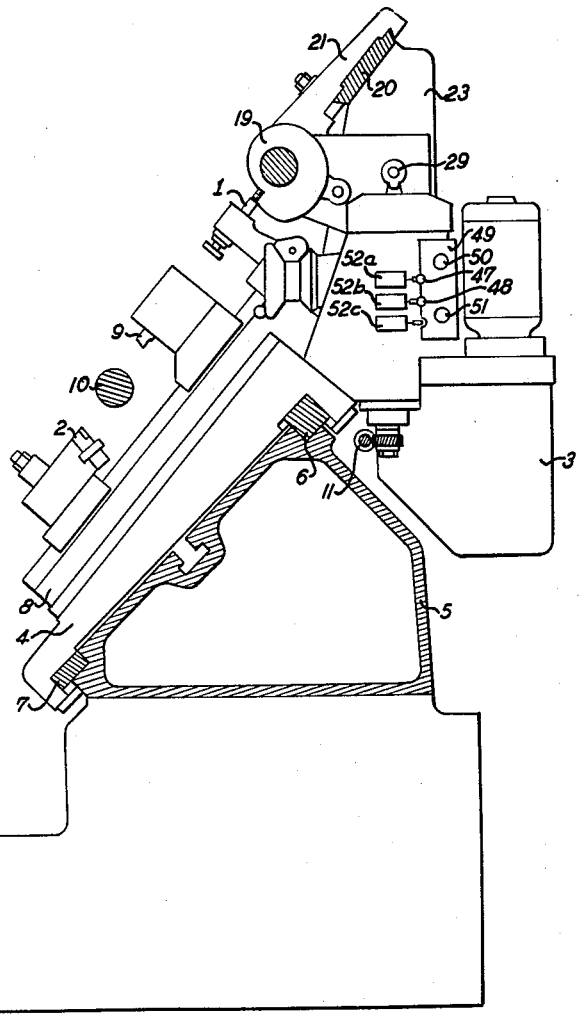
Fig. 4 is a section transvers to the axis of the machine centers.

The copying device 3 (Fig. 4) is mounted on the saddle 4 sliding on the frame 5 of the lathe on inserted guide-ways 6 and 7.

The feeler 1 controls the action of the cross slide 8 supporting the copying tool 2 and the facing tool 9 disposed on either side of the work-piece 10.

The movement of the saddle 4, as disclosed in U.S. Patent No. 2,601,157 is controlled by the lead-screw 11 rotated from the spindle 12 of the headstock 13 by means of the pulleys 14 and 15, belts 16 and feed box 17.

The fixed headstock 13 comprises a rotatable spindle 12 driven by a main motor 12a from a pulley 12b through belts 12c and pulley 12d mounted on spindle 12.

An electro-magnetic coupling device 18 housed in the pulley 15 controls the stopping and starting of the feed motion.

Other mechanisms, illustrated in Figure 13 of the drawings and housed in the feed box 17 are provided for reversing the feed, temporarily reducing or adjusting the value of the selected feed: all these operations are electrically controlled and selected, by means of mechanisms which will be later described.

Figure 2:
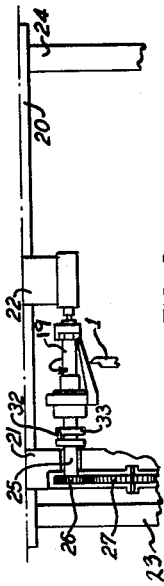
Fig. 2 is a fragmentary sectional view showing the templet and holder therefore.

The feed box 17 contains a series of mechanisms controlled respectively by the closing of electrical circuits including input and output terminals shown diagrammatically for each mechanism in Fig. 2. In the example selected for illustrative purposes, these mechanisms provide the following functions:

17a momentary limitation of feed movements
17b partial rapid feed
17c partial rapid return
17d reversal of feed direction The templet 19 is mounted between centers on the templet-holder 20 by means of fixed supports 21 and 22. The templet-holder 20 is made integral with the frame 5 of the lathe by the upright members 23 and 24 secured to the latter.

The support 21 comprises a spindle 25 rotated by toothed wheels 26, 27 and 28 from a longitudinal stop bar 29 journalled within the upright members 23 and 24 and driven in rotation by a motor 30 and a speed variator 31 carried by the upright 23.

The toothed wheels 26 and 28 have the same number of teeth so that to a complete revolution of the stop bar 29, there corresponds a complete revolution of the spindle 25 which through the medium of the finger 32 carried by the spindle 25 and of the dog 33 rigid with the templet, controls the rotation of the latter on the axis of the centers.

Adjustable stops such as 34 and 35 suitably disposed and clamped longitudinally and angularly on the stop-bar 29, control in each direction and at each end of travel the stoppage of the longitudinal feed of the saddle 4 through the intermediary of an electric control box 36 mounted on the saddle 4 and comprising two push-buttons 37 and 38 adapted to be alternately actuated by the stops 34 and 35.

The stop-bar 29 is shown as having only two stops 34 and 35. It could equally well have a larger number of stops with suitable longitudinal and angular positions.

In the ensuing description of the operation, it will be moreover observed that the action of the contacts 37 and 38 further causes the stop-bar and templet assembly to start rotating by energizing the contactor 39 alternately controlling the contacts 40 and 41.

A notched disk 42 (Figs. 2 and 3) controlling a normally open contact 43 and keyed on one end of the stop-bar 29 causes the rotary motion of the stop-bar and templet assembly to stop in predetermined angular positions. Jointly with this disk and also keyed on the same end of the stop-bar 29 is a drum 44 carrying dogs or cams 45a to 45e suitably distributed on its peripheral surface and controlling a series of contacts 46a to 46c mounted on the upright 24.

Figure 1:
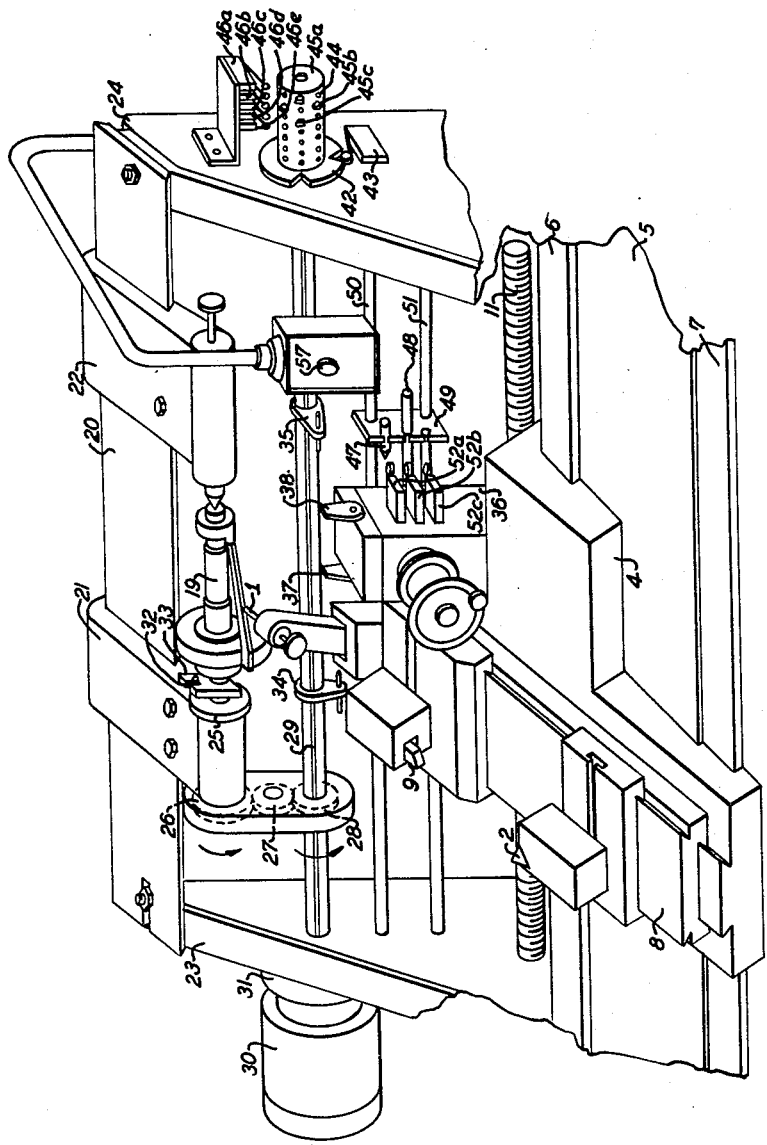
Fig. 1 is a perspective view of the tool-carriage and copying device.
Figure 3:
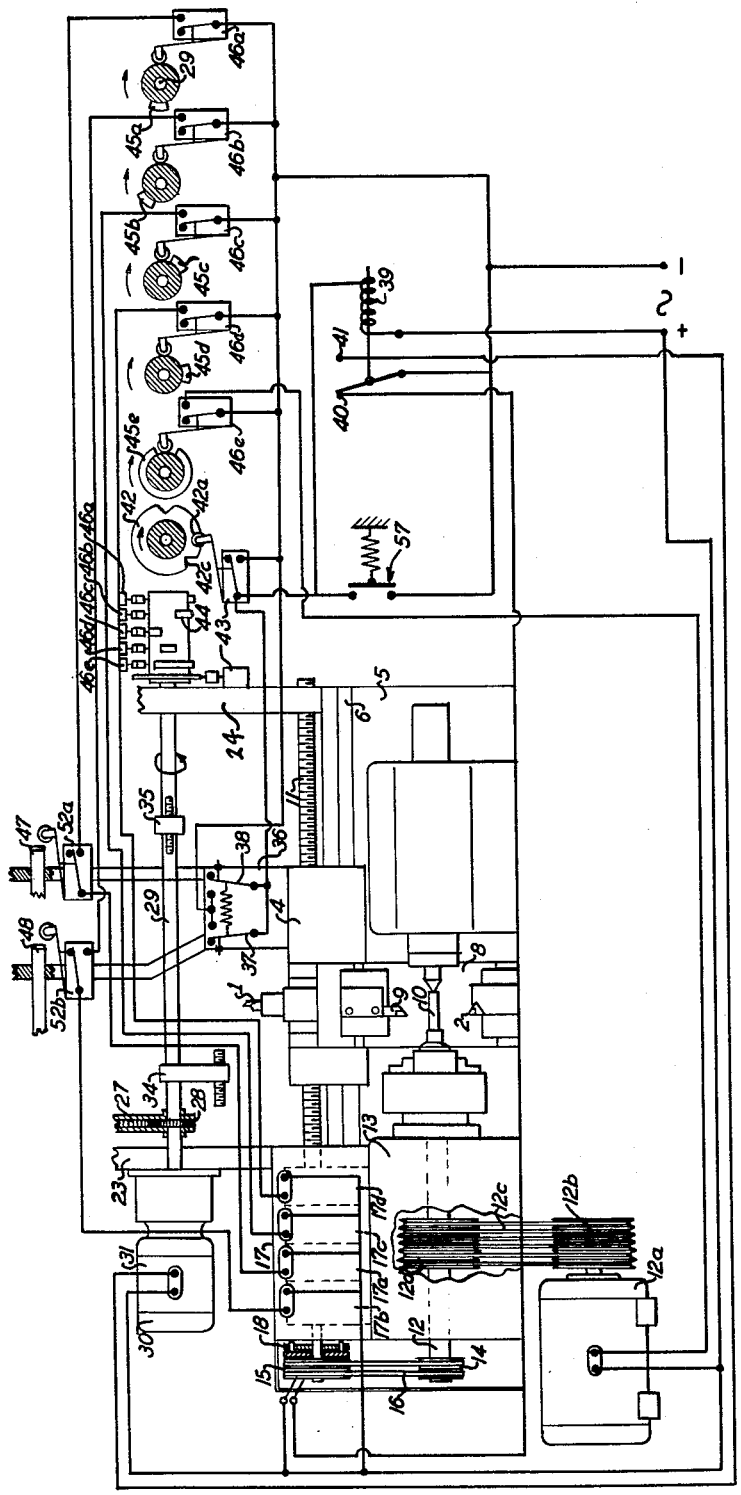
Fig. 3 is a developed top view of the main components of an automatic cycle copying slide lathe including the electrical circuit and components therefor.

As shown in Fig. 3, the disc 42 may be considered an additional cam on the bar 29 cooperating with the contact 43. The function of each cam is as follows:

*First series of functions (control functions)*

Cam 45e and contact 46e: start main motor 12a—continue in operation throughout work cycle—stop at end of cycle.

Cam 45c and contact 46c: control rapid return of carriage 4 through mechanism 17c.

Cam 45d and contact 46d: reversal of feed through mechanism 17d.

*Second series of functions (selection and authorization functions)*

Cam 45b and contact 46b: rapid feed through mechanism 17b.

Cam 45a and contact 46a: slow feed through mechanism 17a.

However, the occurrence of a function of the second series requires simultaneous closing of the circuit of the corresponding mechanism 17a or 17b by mutual engagement of a switch 52a or 52b and a rod 47 or 48 of suitable length and position determined according to the desired operation, all the rods 47 and 48 being mounted on the box 36 movable with the carriage 4.

Figure 5:
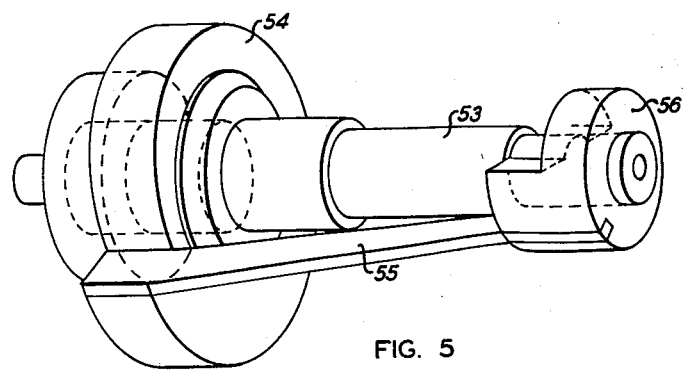
Fig. 5 is a perspective view of a first type of complex templet serving for the description of the operation.

The complex templet illustrated in Fig. 5 and given by way of example for description of a simple working cycle, comprises in its central part a cylindrical body 53 outlined according to the dimensions of the work-piece and adapted to inform the feeler and, consequently, the copying tool 2 in the profile turning step. A cam 54 is fixed to one of the ends of the cylindrical body and faces the feeler when it reaches the end of its travel in a profile turning operation. The outline of this cam 54 is so determined as to impart, by mere rotation, to the feeler and consequently to the cross-slide 8 and still more precisely to the facing tool 9, a controlled plunging motion, then a slight receding motion in order to allow both tools to complely clear the work-piece at that moment. Finally, a guide surface or a strip 55 joining the cam 54 and another cam 56 fixed on the other end of the templet body, serves for maintaining the feeler out of reach of the profile and, consequently, both tools out of the machined piece during the return traverse of the saddle 4. The cam 56 is so designed as to hold the tools out of the work-piece while the latter is being located, then to progressively bring the feeler on the profile to be copied, before starting up the longitudinal feed.

The description of the operation, of which the various steps are diagrammatically illustrated in Figures 7, 7a and 7b to 12, 12a and 12b provide a better understanding of the particular function assumed by each constituent part of the templet.

Figure 7:
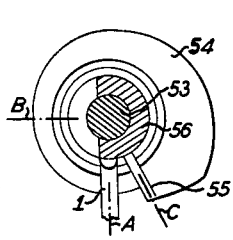
Figure 7A:
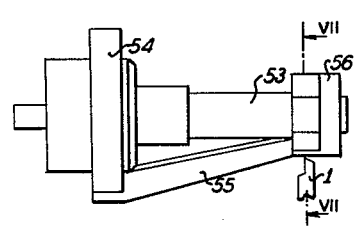
Figure 7B:
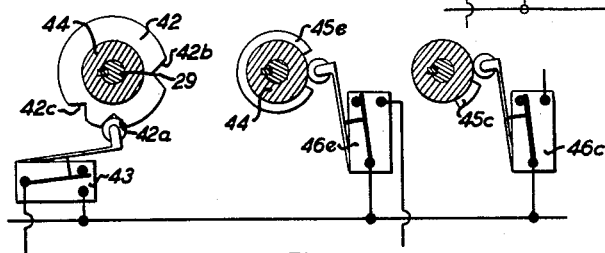

*1st phase: machine stopped, Figs. 7, 7a and 7b*

The position of the contacts is as shown in Figs. 2 and 3 and the feeler is in contact with cam 56. At position A both tools are out of contact with the blank work piece and the motor 12a is stopped.

Figure 8:
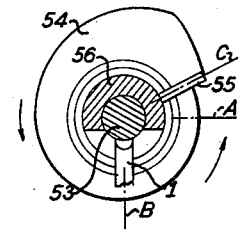
Figure 8A:
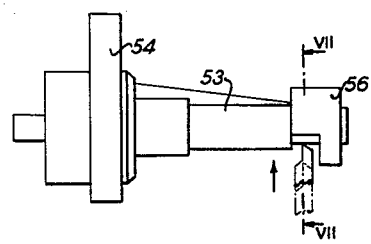
Figure 8B:
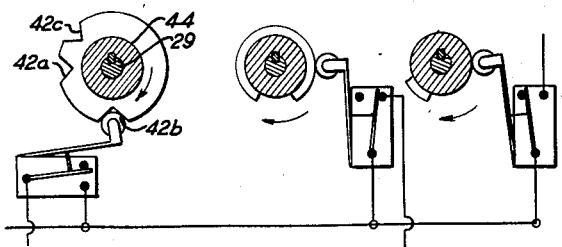

*2nd phase: starting up, Figs. 8, 8a and 8b*

The operator closes switch 57 of Figs. 2 and 3. This supplies current to auxiliary contactor 39, opens contact 40 and closes contact 41. The motor 30 starts up and drives bar 29 and templet 19. The rotation of disc 42 closes contact 43 to supply current to motor 30 when the operator releases the button of switch 57. Meanwhile cam 45e on drum 44 rotates to close contact 46e and start motor 12a. The first notch 42b of disc 42 to pass across the feeler of switch 43 will open this contact to stop rotation of the templet by breaking contact 41 through contactor 39. The feeler 1 is then at position B on one of the profiles to be copied.

Figure 9:
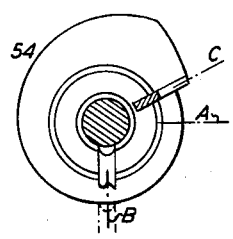
Figure 9A:
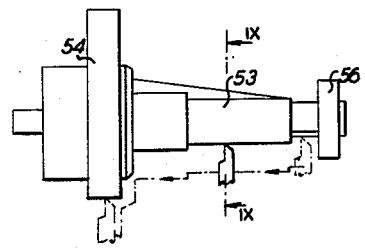
Figure 9B:
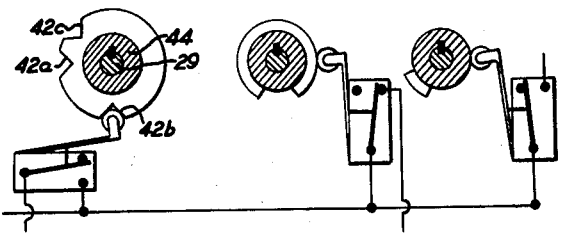

*3rd phase: copying, Figs. 9, 9a and 9b*

The release of contactor 39 causes contact 40 to close, supplying current to the electromagnetic clutch 18 for driven engagement of the lead screw 11 to cause feed movement. At the end of a traverse or of the longitudinal travel of the carriage 4, the contact 37 encounters the stop 34 by which it is closed for supply of current to contactor 39 breaking contact 40 and stopping the feed.

Figures 10, 11:
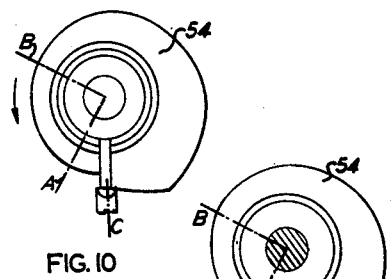
Figure 10A:
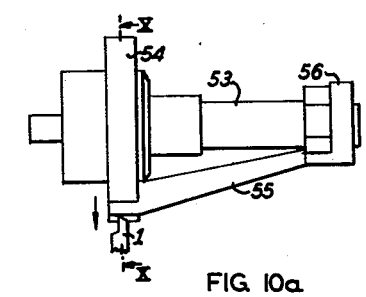
Figure 10B:
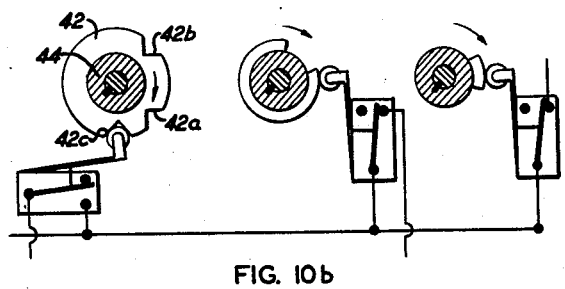

*4th phase: plunge in-feed, Figs. 10, 10a and 10b*

The contact 41 closed by the contactor 39 starts the motor 30. The templet 19 rotates and the cam 54 causes the feeler 1 and tool 2 to recede. At the same time the facing tool 9 engages into the work piece and withdraws slightly. The rotation of the templet ceases at position C when notch 42c of disc 42 is opposite the roller of switch 43. As soon as the templet began to rotate, the stop 34 withdrew from contact 37, but the templet continued to rotate because of prior closing of switch 43.

Figure 11A:
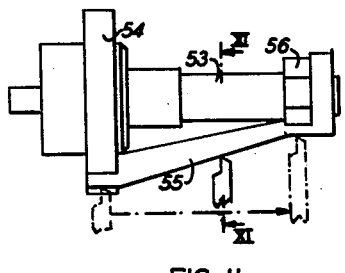
Figure 11B:
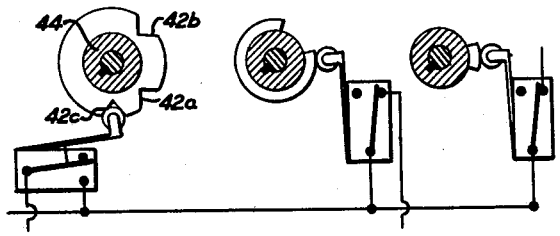

*5th phase: rapid return, Figs. 11, 11a and 11b*

Immediately upon closing of contact 40, the feed controlled by clutch 15 should start again, but position of the drum 44 at this moment determines rapid return caused by the cam 45c closing the contact 46c and informing the mechanism 17c. Thus the feeler 1 is returned in retracted position of the tools, throughout rapid return of the carriage, by contact with rod 55. At the end of the return travel, the contact 38 closed by the stop 35, in the angular position corresponding to rotation of the bar 29, stops the rapid return.

Figure 12:
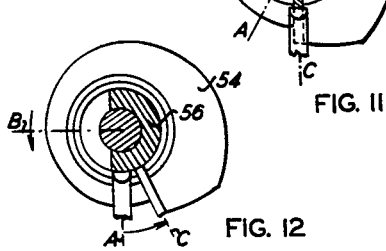
Figure 12A:
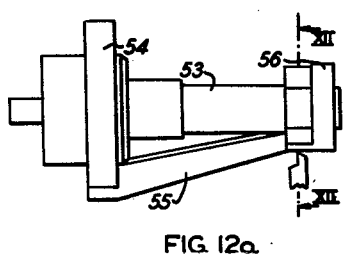
Figure 12B:
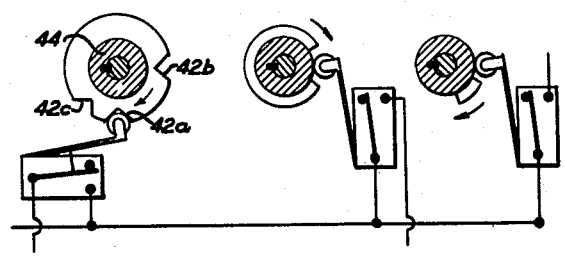

*6th phase: stopping the cycle, Figs. 12, 12a and 12b*

The end of the longitudinal travel causes rotation of the templet from C to A by opening switch 43 with its roller in notch 42a. Meanwhile cam 45c stops the motor 12a by opening contact 46c.

In the simple cycle described above, no use is made of the slow feed through mechanism 17a, the reversal through mechanism 17d, or the rapid feed through mechanism 17b. Accordingly cams 45a, 45d and 45b and contacts 46a, 46d and 46b are not shown in Figs. 7b to 12b.

According to the invention described in U.S. Patent 2,601,157 in the name of A. M. Lelan control of the displacements of the longitudinal saddle 4 sliding on the frame 5 is effected by a hydraulic device of known type, as illustrated in Figure 13 in which hydraulic fluid permanently circulates; the displacements of the saddle are continually controlled by the calibration of an orifice 65 provided in the hydraulic circuit, the calibration changing the pressure which is exerted by the fluid on the control or driving piston 94 which moves the saddle 4. The control member for calibrating the orifice 65 comprises a valve forming a feeler 66 and is housed in a block 67 integral with the frame 5 and constantly kept in contact with the extremity 68 of the guide-screw or lead-screw 11 by means of a spring 69. Feeler 66 acts both as a stop member and a push-rod.

The movements of the valve or feeler 66 are controlled by the axial motions of the screw 11 disposed parallel to the displacements of the saddle 4; screw 11 is rotatably driven integrally with the spindle 12 of the lathe and is capable of minor or "slight" axial displacements bearing with the side of one of its threads against a fixed point of the saddle 4 as will be described hereinafter.

As a result thereof, any disturbance in the regularity of the feed motion of the saddle caused either by an increase or by a decrease of the resistance to the advance is instantaneously expressed by and translated into a change of the reactions exerted by the thread of said screw 11 on the saddle. A slight axial displacement of the feeler then corrects the distribution of the hydraulic fluid and, consequently, the hydraulic feed pressure of the saddle.

The automatic control device is advantageously combined with electromagnetic disconnect devices to permit accelerated movements, notably of quick feed and return motions. For this purpose, the lathe has (Fig. 13) two electromagnets 17a—17d placed on the outside of and on the body of the feed box 17. The first electromagnet serves, by way of a direct drive or clutch 71, for the selective control of either of two fixed-ratio-transmissions 103, 104 and 103', 104' mounted, respectively, loosely on two parallel shafts 105, 110, and the other electromagnet serves by way of a clutch 72 which is fastened or keyed to the shaft 110, for the instantaneous reversal of the direction of rotation of the outlet shaft 70 by means of a set of conical pinions 108, 108' and of the conical gear wheel 109, the pinions being also mounted loosely on the shaft 110. As can be seen, (Figure 14) the other mechanical members of the feed box 17 are the inlet shaft 100 carrying an endless screw or worm gear 101 driving a helical wheel or worm gear follower 102 mounted integrally with the two pinions 103, 103' on the shaft 110.

Similarly, the clutch 71 is mounted on a shaft 105 carrying a pinion gear 106 meshing with another pinion gear 107 mounted at the end of the shaft 110 so as to be driven by the latter without interfering with the axial displacements of same, the pinions 104, 104' being mounted loosely on the shaft 105 as has been stated above. In the set of transmission members 101, 110 of the feed box 17, the two pinions 106 and 107 are interchangeable to permit the adjustment of the feed value selected.

The shaft 110 is coupled to the lead-screw 11 by way of the two toothed pinions 73 and 74. The lead-screw 11 rests and rotates freely in the bearings 75 and 76 carried, respectively, by means of the fixed supports 77 and 24 (upright member) integral with the frame of the machine.

A spring 78 substantially stronger than the spring 69 bears, on the one hand, against a ball thrust bearing 79 applied against the butt support or upright member 24 and, on the other hand, against a ring or collar 80 carried by the lead-screw 11 and presses against the latter, in the absence of any other stress, towards the bearing 66.

On the extremity of the lead-screw 11, there is provided an electromagnet 17b which forms an integral part with the upright member 24 and has a plate core mounted concentrically and axially integrally with the screw 11; the core upon the energization of the electromagnet has the effect of removing the stress placed on the screw 11 by means of the spring 78. The reaction of the threads of the lead-screw against the saddle 4 is ensured by means of mechanism which comprises an upright or support 83 which is coupled to the saddle 4 and movable therewith carries a helical wheel 84 (Figure 15), whose teeth are in constant engagement with the threads of the lead-screw 11; a shaft 85 rotates freely in the upright or support 83 and carries both the helical wheel 84 and a clutch or cup coupling element 86.

Coaxially with the clutch element 86, there is provided another clutch or cone coupling element 87 which is carried by a rod 88 and which slides freely in the upright 83 and is secured against rotation by means of a key 89 housed within the upright 83.

An electromagnet 17c is mounted at the upper extremity of the rod 88 and concentric therewith; the electromagnet 17c comprises a plate core 90 integral with the rod 88 and when operated as a result of the energization the electromagnet 17c has the effect of uncoupling the cone element 87 from the cup element 86 which elements are normally maintained in contact with each other, when at rest, by the action of the spring 91.

The control device for the advance movements operates as follows: The machine is at a standstill; the electric circuits are disconnected and all the electromagnets are released; consequently, the mechanical control of the feed movements is insulated from the support 21 by the opening of the coupling device 18.

With the control device of the saddle 4 in position, the cone element 86 and the cup element 87 are pressed against each other by means of the spring 91 and thereby prevent any rotation of the toothed wheel 84. Finally, the spring 78 positioned against the collar 80 at the end of the guide-screw 11 has pressed back the latter against the feeler 66, whose valve is thus closed since the orifice 65 is completely covered.

As soon as the hydraulic device is started, the oil pressure in the chamber 92, presses back the piston 94 and, consequently, the saddle 4 toward the right since the cross-section of chamber 92 is greater than the annular space 93.

The helical wheel 84 is locked against rotation and integral with the saddle 4 drives the lead-screw 11 toward the right by compressing the spring 78, which has the effect of releasing the valve or feeler 66 and to open the orifice 65.

With the drop in oil pressure (pressure of the hydraulic fluid) in the chamber 92, the motion of the piston stops as soon as the leakage produced by the opening of the orifice 65 permits an equilibrium to be reached between the pressure in the chamber 92 and the pressure in the annular space 93 on the two faces of the piston 94.

If the screw 11 is then caused to rotate by excitation of the coupling device 18, the lead-screw 11 bears with its threaded sides against the helical wheel 84 and, depending on the direction of rotation selected, drives in or releases the valve 66 thereby determining the unbalance of the hydraulic pressures on the faces of the piston 94 and causes the automatic displacement of the saddle 4 in the corresponding direction.

The stopping of the rotary motion of the screw 11 immediately causes the stopping of the saddle 4 by the instantaneous return to the position of equilibrium of the pressures exerted on the piston 94, as described above.

In order to control the quick return (recoil) of the saddle 4 toward the upright 24, the electromagnet 17c disposed within the upright or support 83 is energized. Energization of electromagnet 17c has the effect of removing the pressure which is exerted on the cones 86 and 87 by means of the pressure exerted thereon by the spring 91 and frees the toothed wheel 84.

Pressed by the spring 78 the lead-screw 11 completely closes the valve 66, the pressure rises in 92 pushing back the piston 94 and the saddle 4 toward the upright member 24 in a rapid return motion.

In addition, if the electromagnets 17c and 17b are excited at the same time, the lead-screw 11 drawn by the latter releases the valve 66 which, pressed by its spring 69, completely opens the orifice 65; the hydraulic fluid drops completely in the chamber 92 causing the piston 94 and the saddle 4 to advance quickly toward the fixed headstock 13.

Figure 6:
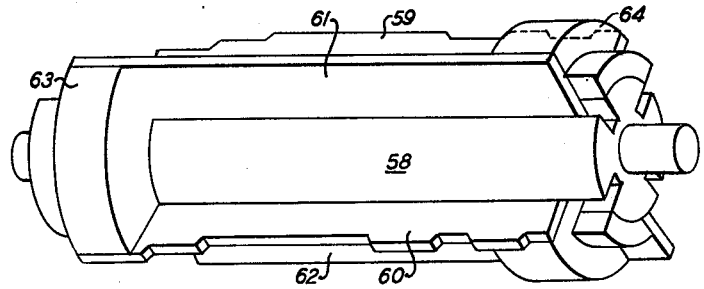
Fig. 6 illustrates a modified form of this type of templet.

Fig. 6 illustrates a modified construction of a complex templet.

In this embodiment, the body of the templet consists of a cylindrical barrel 58 wherein longitudinal slots are provided which serve for fixing strips such as 59 and 60 suitably profiled for copying, as well as strips such as 61 and 62 having an uniform cross-section which serves for the quick transverse and return motions.

Cams 63 and 64 make it possible for the feeler to pass from one strip to the other without disengaging the templet, while it is possible to control as just described, plunge or approach movements of auxiliary tools carried by the cross-slide 8.

The description of such a simple cycle as above described should not be limited to only one copying operation. It is possible in the same manner and as easily, through the machining of still more complex templets, to carry out highly complicated cycles comprising for instance several roughing operations for a same finishing tool, or on the contrary to use in turn roughing and finishing tools reserving to the latter the precision work only, which solution offers substantial advantages for the life of the tool.

While there has been described what is at present considered to be the preferred embodiment of this invention, it will be obvious to those skilled in the art that various changes and modification may be made therein without departing from the scope of the invention.

I claim:

1. A device for controlling the tool of a copying lathe comprising a templet, a feeler movable relative to said templet in contact therewith, said templet including a first portion defining at least one copying contour conforming to at least part of the contour to be reproduced on a work piece with the feeler moving in one direction relative to the templet, at least one second portion defining a guide surface for guiding the feeler in the opposite direction of movement thereof, said guide surface extending longitudinally of the templet positioned radially outside of said copying contour, and at least one third portion defining a cam connecting said first and second portions, means for rotating said templet, a bar extending parallel to the axis of said templet, means for rotating said bar synchronously with said templet, abutments adjustably positioned on said bar longitudinally and angularly thereof in correspondence with said templet, a function drum on said bar determining the speed of movement of said feeler relatively to each templet portion for each angular position of said templet and means for rotating said drum synchronously with said bar.

2. A device as in claim 13 wherein said first portion defines at least three different copying contours and said templet includes at least two cams distributed lengthwise thereof between said copying contours.

3. A device as in claim 2 wherein the positions of said abutments on said bar correspond longitudinally to the positions of said cams and angularly to the positions of said copying contours, respectively, on said templet.

4. A device as in claim 3 comprising means on said drum corresponding to the axial position of at least some of said cams on said templet for controlling predetermined functions.

5. A device as in claim 1, in combination with a selecting mechanism comprising an electrical circuit, dogs and switches movable relatively to each other to open and close the circuit in response to movement of the feeler axially of said templet, and further switches in said circuit actuatable by said function drum, said dogs and switches and said drum and further switches being inter-related to close said circuit only with predetermined angular positions of said drum coinciding in time with predetermined longitudinal positions of said dogs.

6. A device as in claim 5, wherein said first portion defines at least three different copying contours and said templet includes at least two cams distributed lengthwise thereof between said copying contours.

7. A device as in claim 5 wherein the positions of said abutments on said bar correspond longitudinally to the positions of said cams and angularly to the positions of said copying contours, respectively, on said templet.

8. A device as in claim 7 comprising means on said drum corresponding to the axial position of at least some of said cams on said templet for controlling predetermined functions.

References Cited in the file of this patent

UNITED STATES PATENTS

| | | |
|---|---|---|
| 2,342,792 | Dare | Feb. 29, 1944 |
| 2,556,318 | Cooper | June 12, 1951 |
| 2,594,782 | Makant | Apr. 29, 1952 |
| 2,720,129 | Haas | Oct. 11, 1955 |

FOREIGN PATENTS

| | | |
|---|---|---|
| 623,357 | Germany | Dec. 5, 1935 |
| 481,831 | Great Britain | Mar. 18, 1938 |
| 845,295 | Germany | June 5, 1952 |
| 477,827 | Italy | Feb. 9, 1953 |
| 697,568 | Great Britain | Sept. 23, 1953 |
| 1,087,004 | France | Sept. 13, 1952 |